US006292917B1

(12) United States Patent
Sinha et al.

(10) Patent No.: US 6,292,917 B1
(45) Date of Patent: Sep. 18, 2001

(54) UNEQUAL ERROR PROTECTION FOR DIGITAL BROADCASTING USING CHANNEL CLASSIFICATION

(75) Inventors: Deepen Sinha; Carl-Erik Wilhelm Sundberg, both of Chatham, NJ (US)

(73) Assignee: Agere Systems Guardian Corp., Orlando, FL (US)

( * ) Notice: Subject to any disclaimer, the term of this patent is extended or adjusted under 35 U.S.C. 154(b) by 0 days.

(21) Appl. No.: 09/163,656

(22) Filed: Sep. 30, 1998

(51) Int. Cl.[7] .................................................... H03M 13/00

(52) U.S. Cl. .......................... 714/752; 375/299; 714/786; 714/790

(58) Field of Search .................................... 714/752, 790, 714/795, 786; 375/299; 382/232; 455/452, 450; 704/223

(56) References Cited

U.S. PATENT DOCUMENTS

| | | | | |
|---|---|---|---|---|
| 5,243,629 | * | 9/1993 | Wei | 375/299 |
| 5,463,641 | | 10/1995 | Dorward et al. | 714/755 |
| 5,850,482 | * | 12/1998 | Meany et al. | 382/232 |
| 5,887,263 | * | 3/1999 | Ishii | 455/452 |
| 5,991,717 | * | 11/1999 | Minde et al. | 704/223 |
| 6,052,594 | * | 4/2000 | Chuang et al. | 455/450 |
| 6,108,810 | * | 8/2000 | Kroeger et al. | 714/790 |

OTHER PUBLICATIONS

D. Sinha, J.D. Johnston, S. Dorward and S.R. Quackenbush, "The Perceptual Audio Coder," in Digital Audio, Section 42, pp. 42–1 to 42–18, CRC Press, 1998.

N.S. Jayant and E.Y. Chen, "Audio Compression: Technology and Applications," AT&T Technical Journal, pp. 23–34, vol. 74, No. 2, Mar.–Apr. 1995.

J. Hagenauer, "Rate Compatible Punctured Convolutional Codes (RCPC Codes) and their Applications," IEEE Transactions on Communications, vol. 36, No. 4, pp. 389–400, Apr. 1988.

J. Hagenauer et al., "The Performance of Rate–Compatible Punctured Convolutional Codes for Digital Mobile Radio," IEEE Transactions on Communications, vol. 38, No. 7, pp. 966–980, Jul. 1990.

R.V. Cox et al., "Sub–band Speech Coding and Matched Convolutional Channel Coding for Mobile Radio Channels," IEEE Transactions on Acoustics, Speech and Signal Processing, vol. 39, No. 8, pp 1717–1731, Aug. 1991.

A.R. Calderbank and N. Seshadri, "Multilevel Codes for Unequal Error Protection," IEEE Transactions on Information Theory, vol. 39, No. 4, pp. 1234–1248, Jul. 1993.

C.–E.W. Sundberg, "Digital Audio Broadcasting in the FM Band," Proceedings of the IEEE Symposium on Industrial Electronics, Portugal, Jul. 7–11, 1997.

C.–E.W. Sundberg, "Digital Audio Broadcasting: An Overview of Some Recent Activities in the U.S.," Proceedings of Norsig–97, Norwegian Signal Processing Symposium, Tromso, Norway, May 23–24, 1997.

* cited by examiner

*Primary Examiner*—Albert Decady
*Assistant Examiner*—David Ton
(74) *Attorney, Agent, or Firm*—Ryan, Mason & Lewis, LLP

(57) ABSTRACT

The invention provides methods and apparatus for processing information, e.g., audio, video or image information, for transmission in a communication system. In an illustrative embodiment, interference characteristics are determined for a set of n channels to be used to transmit audio information bits, where n is greater than or equal to two. The audio information bits are separated into n classes based on error sensitivity, for example, the impact of errors in particular audio data bits on perceived quality of an audio signal reconstructed from the transmission. The classes of bits are then assigned to the n channels such that the classes of bits having the greatest error sensitivity are transmitted over the channels which are the least susceptible to interference. The interference characteristics associated with the n channels can be determined by, for example, measuring interference levels for one or more of the channels, or obtaining information regarding known interference levels for one or more of the channels. The channels may correspond to different frequency bands, time slots, code division slots or any other type of channels. The invention can provide UEP for different classes of audio information bits even in cases in which the same convolutional code, or the same complementary punctured pair convolutional (CPPC) code pair, is used to encode the classes. The assignment of the classes of bits to the channels, as well as the characteristics of the classes and the channels, may be fixed or dynamic.

32 Claims, 2 Drawing Sheets

UNEQUAL ERROR PROTECTION FOR DIGITAL BROADCASTING USING CHANNEL CLASSIFICATION

FIELD OF THE INVENTION

The present invention relates generally to digital audio broadcasting (DAB) and other techniques for transmitting information, and more particularly to techniques for providing unequal error protection (UEP) for different classes of audio, video, image or other information bits encoded in a source coding device.

BACKGROUND OF THE INVENTION

Most source coded bit streams exhibit unequal sensitivity to bit errors. For example, certain source bits can be much more sensitive to transmission errors than others. Moreover, errors in certain bits, such as control bits, may lead to severe error propagation and a corresponding degradation in reconstructed signal quality. Such error propagation can occur, for example, in the output audio bits of an audio coder due to the use of control bits for codebook information, frame size information, synchronization information and so on. The perceptual audio coder (PAC) described in D. Sinha, J.D. Johnston, S. Dorward and S.R. Quackenbush, "The Perceptual Audio Coder," in Digital Audio, Section 42, pp. 42-1 to 42-18, CRC Press, 1998, which is incorporated by reference herein, attempts to minimize the bit rate requirements for the storage and/or transmission of digital audio data by the application of sophisticated hearing models and signal processing techniques. In the absence of channel errors, a PAC is able to achieve near stereo compact disk (CD) audio quality at a rate of approximately 128 kbps. At a lower bit rate of 96 kbps, the resulting quality is still fairly close to that of CD audio for many important types of audio material.

The rate of 96 kbps is particularly attractive for FM band transmission applications such as in-band digital audio broadcasting (DAB) systems, which are also known as hybrid in-band on-channel (HIBOC), all-digital IBOC and in-band adjacent channel (IBAC)/in-band reserve channel (IBRC) DAB systems. There is also a similar effort underway to provide digital audio broadcasting at lower audio bit rates in the AM band. For these AM systems, audio bit rates of about 32 to 48 kbps are being considered for daytime transmission and about 16 kbps for nighttime transmission. Higher audio bit rates, greater than about 128 kbps, are being used in multiple channel DAB systems. The transmission channels in the above-noted DAB systems tend to be severely bandlimited and noise limited at the edge of a coverage area. For mobile receivers, fading is also a severe problem. It is therefore particularly important in these and other applications to design an error protection technique that is closely matched to the error sensitivity of the various bits in the compressed audio bit stream.

PACs and other audio coding devices incorporating similar compression techniques are inherently packet-oriented, i.e., audio information for a fixed interval (frame) of time is represented by a variable bit length packet. Each packet includes certain control information followed by a quantized spectral/subband description of the audio frame. For stereo signals, the packet may contain the spectral description of two or more audio channels separately or differentially, as a center channel and side channels (e.g., a left channel and a right channel). Different portions of a given packet can therefore exhibit varying sensitivity to transmission errors. For example, corrupted control information leads to loss of synchronization and possible propagation of errors. On the other hand, the spectral components contain certain interframe and/or interchannel redundancy which can be exploited in an error mitigation algorithm incorporated in a PAC codec. Even in the absence of such redundancy, the transmission errors in different audio components have varying perceptual implications. For example, loss of stereo separation is far less annoying to a listener than spectral distortion in the mid-frequency range in the center channel.

Unequal error protection (UEP) techniques are designed to match error protection capability with sensitivity to transmission errors, such that the most important bits are provided with the highest level of error protection, while less important bits are provided with a lesser level or levels of error protection. A conventional two-level UEP technique for use in DAB applications is described in N.S. Jayant and E.Y. Chen, "Audio Compression: Technology and Applications," AT&T Technical Journal, pp. 23–34, Vol. 74, No. 2, March-April 1995. In this technique, which is based on a Reed-Solomon (RS) code, the control information is protected more robustly since it is not possible to use error mitigation on the non-redundant control information. In fact, the proper operation of the error mitigation algorithm used in a PAC codec is itself dependent upon reliable control information. All of the non-control spectral information in this technique is protected using a uniform level of error protection. U.S. patent application Ser. No. 09/022,114, which was filed Feb. 11, 1998 in the name of inventors Deepen Sinha and Carl-Erik W. Sundberg, and which is incorporated by reference herein, discloses techniques for providing UEP of a PAC bitstream by classifying the bits in different categories of error sensitivity. These classes were then matched to a suitable level of error protection to minimize the overall impact of errors, i.e., the most sensitive bits are more protected than the others. Certain of the UEP techniques described in the above-cited application generally provide improvements without regard to the type of channel, and the channel noise is typically assumed to be averaged over time and frequency by interleaving in both time and frequency for each channel code class. Thus, a UEP technique with a more powerful channel code properly matched to the most sensitive source bits always outperforms the corresponding equal error protection (EEP) technique. However, determining the channel codes for such UEP scenarios is often a nontrivial problem, particularly in the case of determining single sideband complementary punctured-pair convolutional codes (CPPC) codes for HIBOC applications. Therefore, although the techniques in the above-cited application provide considerable improvement over prior approaches to UEP for digital audio, further improvements are needed for certain implementations, such as the above-noted HIBOC systems and other similar systems.

SUMMARY OF THE INVENTION

The present invention provides methods and apparatus for implementing UEP for a source coded bit stream such as that generated by a perceptual audio coder (PAC). In an illustrative embodiment, interference characteristics are determined for a set of n channels to be used to transmit audio information bits, where n is greater than or equal to two. The audio information bits are separated into n classes based on error sensitivity, for example, the impact of errors in particular audio data bits on perceived quality of an audio signal reconstructed from the transmission. The classes of bits are then assigned to the n channels such that the classes of bits having the greatest error sensitivity are transmitted over the channels which are the least susceptible to interference. The interference characteristics associated with the n channels can be determined by, for example, measuring interference levels at different times and locations for one or more of the channels, or obtaining information regarding known interference levels for one or more of the channels. The channels may correspond to different frequency bands, time slots, code division slots or any other type of channels. The channel properties may also change with factors such as time and location within a coverage area.

In accordance with another aspect of the invention, the assignment of the classes of bits to the channels, as well as the characteristics of the classes and the channels, may be fixed or dynamic. For example, in applications in which the interference characteristics associated with one or more of the channels vary as a function of time, position within a coverage area, or other factors, the assignment of the classes of bits to the channels can be varied so as to ensure that the classes of bits having the greatest error sensitivity continue to be transmitted over the channels which are least susceptible to interference. As another example, amounts of channel resources used for particular classes of audio information bits can vary as a function of time.

The invention can provide UEP for different classes of information bits even in cases in which the same convolutional code, or the same CPPC code pair, is used to encode the classes, although different channel codes could also be used to encode the classes. The invention can be applied to other types of digital information, including, for example, video and image information. Moreover, the invention is applicable not only to perceptual coders but also to other types of source encoders using other compression techniques operating over a wide range of bit rates, and can be used with transmission channels other than radio broadcasting channels.

DETAILED DESCRIPTION OF THE INVENTION

The invention will be described below in conjunction with exemplary unequal error protection (UEP) techniques for use in the transmission of audio information bits, e.g., audio bits generated by an audio coder such as the perceptual audio coder (PAC) described in D. Sinha, J.D. Johnston, S. Dorward and S.R. Quackenbush, "The Perceptual Audio Coder," in Digital Audio, Section 42, pp. 42-1 to 42-18, CRC Press, 1998. It should be understood, however, that the UEP techniques of the invention may be applied to many other types of information, e.g., video or image information, and other types of coding devices. In addition, the invention may be utilized with a wide variety of different types of communication applications, including communications over the Internet and other computer networks, and over cellular multimedia, satellite, wireless cable, wireless local loop, high-speed wireless access and other types of communication systems. Although illustrated at least in part using frequency bands as channels, the invention may also be applied to many other types of channels, such as, for example, time slots, code division multiple access (CDMA) slots, and virtual connections in asynchronous transfer mode (ATM) or other packet-based transmission systems. The term "channel" as used herein should be understood to include any identifiable portion or portions of a communication medium which is used to transmit one or more signals and has an interference characteristic associated therewith, and is thus intended to include, for example, a sub-channel, segment or other portion of a larger channel.

Figure 1:
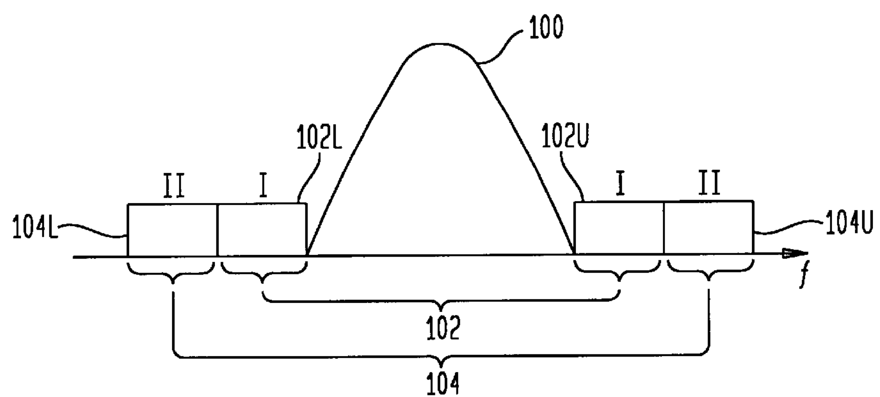
FIG. 1 illustrates a two-class frequency division unequal error protection (UEP) technique is accordance with the invention as applied to an exemplary hybrid in-band on-channel (HIBOC) digital audio broadcasting (DAB) system.

FIG. 1 illustrates channel classification UEP in accordance with an illustrative embodiment of the invention. In this embodiment, which is particularly well-suited for use in HIBOC DAB applications, the channels correspond generally to frequency bands, and the UEP technique is therefore referred to as frequency division UEP. Unlike certain of the approaches described in the above-cited U.S. patent application Ser. No. 09/022,114, which can generally be characterized as time division UEP in which enhanced error protection may be provided for a certain class or classes of audio bits transmitted using a number of different channels, frequency division UEP in accordance with the invention provides enhanced error protection for a given class of bits by assigning that class of bits to a particular channel for transmission.

In the embodiment of FIG. 1, a portion of a frequency spectrum in an exemplary HIBOC DAB system is shown, including an analog host FM signal 100 with associated lower sidebands 102L, 104L and corresponding upper sidebands 102U, 104U. The sidebands represent portions of the frequency spectrum used to transmit digital audio information, and the sets of sidebands 102L, 102U and 104L, 104U correspond generally to frequency channels 102, 104, respectively, used to transmit the digital audio information. In accordance with the invention, a determination is made as to the interference characteristics associated with each of the frequency channels 102 and 104. This determination may be based, for example, on actual measurements of average signal-to-interference ratios within the channels, on known or estimated interference levels, or on any other information which provides an indication of relative or absolute interference levels for the channels. For example, it has been estimated based on previous experience with HIBOC systems that the portion of the spectrum of FIG. 1 at the highest and lowest frequencies is typically more susceptible to interference than the portion closest to the analog host FM signal 100. It will therefore be assumed that one of the channels, i.e., channel 102 in this example, has been determined to be less susceptible to interference than channel 104.

The illustrative embodiment of the invention, after determining the relative or absolute interference levels associated with n channels, where $n \geqq 2$, to be used for transmission of digital audio information, separates the audio information into n classes of bits based on error sensitivity, and then assigns the n classes of bits to the n channels such that the bits most sensitive to errors are transmitted in the channels which are least susceptible to interference. In the FIG. 1 example, the audio information bits are separated into two classes, designated class I and class II, with class I including the bits most sensitive to errors. The determination of error sensitivity may be based on perceptual audio coding considerations such as those described in the above-cited U.S. patent application Ser. No. 09/022,114. For example, class I may include the audio control bits as well as certain audio data bits corresponding to frequency bands which are perceptually important in reconstructing the encoded audio signal. These and other error sensitivity classification techniques are described in greater detail in Application Ser. No. 09/022,114, and will not be further described herein.

In the FIG. 1 example, the most sensitive audio information bits, i.e., class I, are transmitted in channel 102, i.e., the channel determined to be less susceptible to interference. This provides an increased robustness for the class I bits against the higher interference levels in channel 104. The two-class frequency division UEP approach illustrated in FIG. 1 will provide improvements over a conventional EEP approach. In one possible implementation of the FIG. 1 approach, the same channel code may be used for both the class I and II bits, but with a separate interleaving in time and frequency. It should be noted that the above-described frequency division UEP approach generally provides no improvement for channels which have a uniform interference level as a function of frequency. However, by taking into account the different interference characteristics of the channels, it can provide UEP for different classes of bits using the same code.

Figure 2:
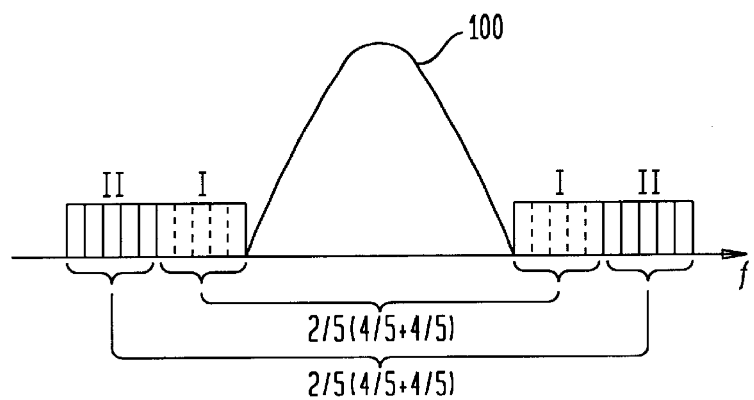
FIGS. 2 through 4 illustrate a number of possible alternative implementations of the two-class UEP technique of FIG. 1.

FIG. 2 illustrates another possible implementation of a two-class frequency division UEP approach in accordance with the invention. This example uses complementary punctured-pair convolutional (CPPC) codes, such as those described in greater detail in U.S. patent application Ser. No. 09/006,570, which was filed Jan. 13, 1998 in the name of inventors Brian Chen and Carl-Erik W. Sundberg, and is incorporated by reference herein. In this example, the bits in classes I and II are each separately coded using a rate-2/5 code which is formed as a combination of a pair of rate-4/5 CPPC codes. These rate-4/5 codes are referred to as half-bandwidth codes, and combine to form a rate-2/5 error correction code referred to as a full-bandwidth code. As is described in U.S. patent application Ser. No. 09/006,570, a rate-1/3 mother code can be punctured to meet these exemplary HIBOC code requirements. The rate-1/3 mother code may be a rate-1/3 convolutional code having a constraint length K=7 as described in J. Hagenauer, "Rate-compatible punctured convolutional codes (RCPC codes) and their applications," IEEE Transactions on Communications, Vol. 36, No. 7, pp. 389–400, April 1988.

The code rate is the ratio of input bits to output bits for the convolutional encoder, i.e., a rate-1/3 encoder generates three output bits for each input bit. A group of three coded output bits is referred to as a symbol. The value of K refers to the number of uncoded input bits which are processed to generate each output symbols. For example, a rate-1/3 convolutional encoder with K=7 generally includes a seven-bit shift register and three modulo-two adders. The inputs of the each of the adders are connected to a different subset of the bits of the shift register. These connections are specified by the "generators" of the encoder. Because a given output symbol in this example is generated using the latest input bit as well as the previous six input bits stored in the shift register, the K=7 encoder is said to have a "memory" of six. The rate-1/3, K=7 code used in this example has the following three generators:

$$g_0=1011011$$

$$g_1=1111001$$

$$g_2=1100101$$

Each of the generators may be viewed as specifying the connections between bits of the seven-bit shift register and inputs of one of the modulo-2 adders. For example, the adder corresponding to generator $g_0$ generates the first bit of each output symbol as the modulo-2 sum of the bits in the first, third, fourth, sixth and seventh bit positions in the shift-register, with the first bit position containing the latest input bit. Similarly, the generators $g_1$ and $g_2$ generate the second and third bits, respectively, of each output symbol as modulo-2 sums of the bits in the positions designated by the respective generator values. The free Hamming distance $d_f$ of the rate-1/3, K=7 code with the above-noted generators is 14, and its information error weight $c_{d_f}/P$ is one. When this code is punctured in a rate-compatible manner to rates of 4/11, 4/10, 4/9 and 1/2, the resulting rate-1/2 code is also the best rate-1/2, K=7 convolutional code. Additional details regarding specific CPPC codes suitable for use in embodiments of the invention, as well as bit placement strategies for arranging the bits within the upper and lower sideband portions of the channels, can be found in U.S. patent application Ser. No. 09/006,570.

Figure 3:
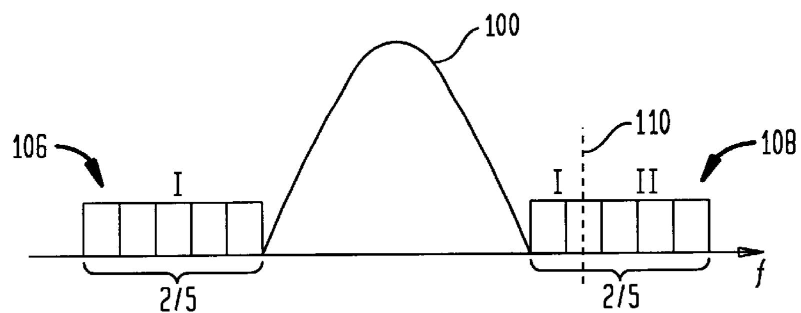
Figure 4:
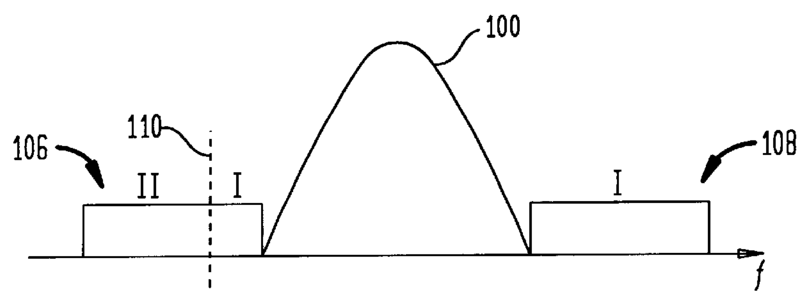

FIGS. 3 and 4 illustrate other embodiments of the invention in which a dynamic boundary between class I and class II bits is used. In each of these embodiments, the boundary between class I and class II is as indicated by the dashed line 110. The portion of the frequency spectrum shown in FIGS. 3 and 4 includes the analog host FM signal 100, along with a lower sideband 106 and an upper sideband 108. As in the examples of FIGS. 1 and 2, the upper and lower sidebands are used to transmit digital audio information. In the FIG. 3 embodiment, the channels do not correspond directly to specific portions of the upper and lower sidebands. Instead, a first channel is defined by a portion of both the upper and lower sideband to one side of the dashed line 110, while a second channel is defined by the portion of the upper and lower sideband to the other side of the dashed line 110. Each of the upper and lower sidebands 106 and 108 uses, e.g, the same rate-2/5 code, as indicated. The use of a dynamic boundary allows a channel occupying a greater portion of the available frequency spectrum to be used to transmit class I bits. FIG. 4 shows another possible implementation using a dynamic boundary 110. A control channel or other suitable mechanism may be used to inform the receiver in a particular geographical area which configuration, e.g., the configuration of FIG. 3, the configuration of FIG. 4, or another type of configuration, is being used at the transmitter. The configuration may vary as a function of factors such as time or position within a coverage area.

It should be noted that in the embodiments of FIGS. 1 through 4, the same code, e.g., the same CPPC code pair, may be used for both classes I and II, or different codes may be used for each of the classes. In addition, as previously noted, the techniques can be readily extended in a straightforward manner to n channels and classes, where $n \geqq 2$. Other possible variations include, for example, separate or joint interleaving, soft combining or equal gain combining, fixed or variable bit assignments, and use of other types of codes such as block codes.

Figure 5:
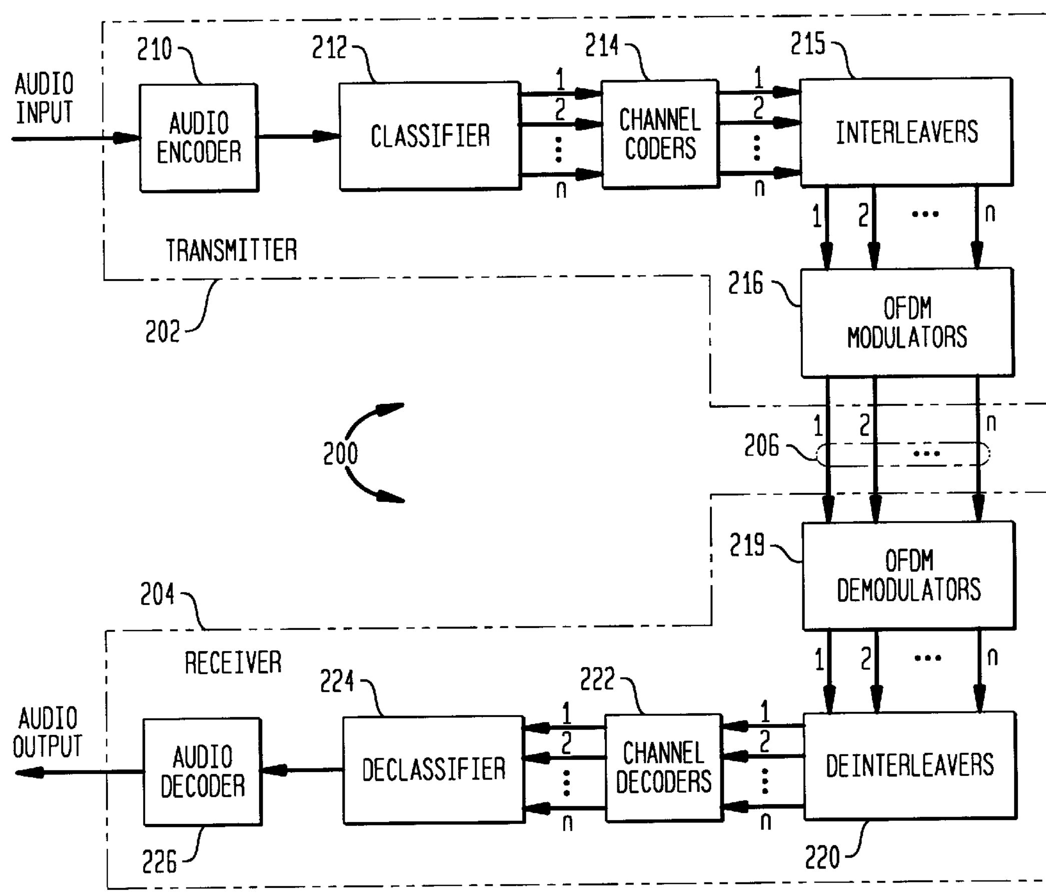
FIG. 5 is a block diagram of a communication system in which an n-class frequency division UEP technique is implemented in accordance with an illustrative embodiment of the invention.

FIG. 5 is a block diagram of an exemplary communication system 200 which implements the above-described frequency division UEP in accordance with the invention. The system 200 includes a transmitter 202 and a receiver 204 which communicate over an n-channel transmission medium 206. The transmitter 202 includes an audio encoder 210, e.g., a PAC encoder, for generating a sequence of audio packets from an analog audio input signal. Although this embodiment uses audio packets, such as those generated by a PAC encoder, the invention is more generally applicable to digital audio information in any form and generated by any type of audio compression technique. The audio packets from encoder 210 are applied to a classifier 212 which converts the packets into separate bit streams corresponding to n different classes of audio information bits. The classifier 212 is also responsible in this embodiment for assigning each of the classes of bits to one of the available channels such that the classes of bits most sensitive to errors are transmitted in the channels which are least susceptible to interference, as previously described. The separate bit streams from the classifier 212 are applied to a set of channel coders 214. The symbol outputs of the channel coders 214 are supplied to a set of interleavers 215 which provide interleaving of the symbols within each channel over multiple audio packets. The interleaved symbols are then supplied to a set of orthogonal frequency division multiplexed (OFDM) modulators 216 for modulation in accordance with conventional OFDM techniques. The OFDM modulators may provide, for example, single-carrier modulation in each of the channels. Of course, other types of modulation may be used in alternative embodiments.

The transmitter 202 may include additional processing elements, such as a multiplexer, an upconverter and the like, which are not shown in FIG. 5 for simplicity of illustration. In addition, the arrangement of elements may be varied in alternative embodiments. For example, other types of modulators may be used in place of the OFDM modulators 216, such as modulators suitable for generating signals for transmission over a telephone line or other network connection, and separate interleaving and coding need not be applied to each of the channels.

The receiver 204 receives the transmitted OFDM signals from the transmission channels 206, and processes them in OFDM demodulators 219 to recover the interleaved symbols for each of the channels. The symbols are deinterleaved in a set of deinterleavers 220, and then applied to a set of channel decoders 222. The bit streams at the output of each of the decoders in the set of decoders 222 correspond to the different classes of audio information bits. These bit streams are then processed in a declassifier 224 which reconstructs audio packets from the bit streams. The resulting sequence of audio packets are then decoded in an audio decoder 226 to reconstruct the original analog audio signal.

Like the transmitter 202, the receiver 204 may include additional processing elements which are not shown in FIG. 5. It should also be noted that various elements of the system 200, such as the interleavers 215 and the deinterleavers 220, may be eliminated in alternative embodiments. Moreover, various elements of the system 200, such as the audio encoder 210 and decoder 226, the channel coders 214 and decoders 222, and the classifier 212 and declassifier 224, may be implemented using an application-specific integrated circuit, microprocessor or any other type of digital data processor, as well as portions or combinations of such devices. Various aspects of the invention may also be implemented in the form of one or more software programs executed by a central processing unit (CPU) or the like in the digital data processor.

Simulation results for an exemplary frequency division UEP (FD-UEP) system such as that described in conjunction with FIGS. 1–5 are shown in TABLE 1 below. In the simulations, a channel was assumed to include two disjoint segments, designated segment I and segment II. Such segments are also referred to herein as sub-channels, and it should be noted that each segment is itself considered to fall within the general definition of "channel" given above. In other words, each segment may be considered a channel. With a suitable interleaver depth, the channel quality may be assumed to be constant over a particular segment. The two segments can thus be parameterized by an interference characteristic such as, for example, the corresponding signal-to-noise level measured in terms of $E_s/N_0$. Gaussian channel conditions are assumed in the simulations.

In an EEP transmission system operating over segments I and II, it is reasonable to assume half of the channel coded bits encounter a channel condition which exists in segment I and another half encounter conditions existing in segment II. For the FD-UEP system, it is assumed that audio information bits are separated into a class I which includes control bits and a first portion of the audio data bits, and a class II which includes a second portion of the audio data bits. These classes I and II may correspond, for example, to classes 1* and 2*, respectively, as described in application Ser. No. 09/022,114. In accordance with the present invention, the class I and II bits may be interleaved and transmitted independently over segments I and II, respectively. Therefore, class I bits are exposed to the channel condition in segment I and class II bits face the channel condition in segment II. In each of the simulations, a convolutional channel code with a rate of 2/5 was used, as described above, and the same outer cyclic redundancy codes (CRCs) were also used.

TABLE 1

| Simulation No. | Channel Condition ($E_s/N_0$) in dB Segment I | Segment II | EEP Quality | FD-UEP Quality |
|---|---|---|---|---|
| 1. | −0.5 | −0.5 | Slight distortion | Slight distortion |
| 2. | −0.5 | −2.5 | Partial Breakdown (~50% Muting) | Some distortions Audio BW reduction Some noise bursts |
| 3. | −0.5 | −3.0 | Total Breakdown (>75% Muting) | Some distortions Audio BW reduction |

Subjective audio quality for the above-described EEP and FD-UEP systems were evaluated for different channel conditions, and the qualitative results are summarized in TABLE 1. As expected, if the channel conditions on the two segments are roughly equivalent, as in simulation 1 in TABLE 1, both EEP and FD-UEP systems perform similarly. On the other hand, it is clear from simulations 2 and 3 in TABLE 1 that when the conditions in the two segments are substantially different, the FD-UEP system exhibits a much more graceful degradation. More specifically, if a given channel condition exists in segment I and segment II is approximately 2.0 dB worse, the EEP system is unacceptable with muting nearly half the time. The FD-UEP system, in contrast, survives with only reduced audio bandwidth and some increase in distortions. When the channel condition in segment II is about 2.5 dB worse than that in segment I, the EEP system mutes more than 75% of the time, while the FD-UEP system survives albeit with lower audio bandwidth and increased distortions. In other words, as the interference level in segment II increases, the audio quality in the FD-UEP system "bottoms out" at a lower yet often acceptable quality level. By way of comparison, the EEP system mutes almost completely under these same conditions.

The distortions noticed in the FD-UEP system in simulations 2 and 3 of TABLE 1 are primarily due to audio bandwidth reduction and aliasing attributable to the classifier described in application Ser. No. 09/022,114. If the difference in the channel conditions between segment I and II is relatively moderate, there is one other potential distortion as noticed in simulation 2, i.e., an occasional burst of high frequency noise. This happens when channel conditions in segment I are much beyond the point of failure for class II bits, i.e., >20% PAC packet loss for these bits, yet not severe enough, i.e., <50–60% PAC packet loss, to lead to a complete muting for class II in the PAC error mitigation algorithm. This may lead to a situation in which the performance of the FD-UEP system may actually improve slightly when the channel condition in segment II becomes progressively worse beyond a certain threshold. It should be noted that in spite of the above-described distortions, the simulations clearly indicate that an FD-UEP system in accordance with the invention is preferable to an EEP system at least in terms of providing a more graceful performance degradation.

The above-described embodiments of the invention are intended to be illustrative only. For example, the invention can be applied to the transmission of digital information other than audio, such as video, images and other types of information. In addition, alternative embodiments of the invention may utilize different types of channels. Different types of coding, e.g., convolutional coding with different memories or other characteristics, or other types of codes such as block codes, may also be used. Furthermore, the invention may make use of different types of modulation, including, e.g., single-carrier modulation in every channel, or multi-carrier modulation, e.g., OFDM, in every channel. A given carrier can be modulated using any desired type of modulation technique, including, e.g., a technique such as m-QAM, m-PSK or trellis coded modulation.

It should be noted that any of the error sensitivity classification techniques described in the above-cited U.S. patent application Ser. No. 09/022,114, including multi-packet error protection profiles, may be used to classify the information bits in terms of error sensitivity. The UEP techniques described in Application Ser. No. 09/022,114 may be used to provide further levels of UEP within a given class, e.g., within a class assigned to a channel having a substantially uniform interference level. In addition, the techniques of the invention may be used to provide any number of different classes of UEP for information, and may be used with a wide variety of different bit rates and transmission channels. For example, as previously noted, alternative embodiments can extend the illustrative two-class techniques described above to any desired number n of classes in a straightforward manner.

Further embodiments of the invention could use other techniques for providing adaptive numbers and types of different classes and channels. In addition, the number and/or characteristics of the channels and classes, as well as the assignment of classes to channels, may be fixed or dynamic. For example, if the interference characteristics associated with the channels vary as a function of time or position within a coverage area, the assignment of the classes of bits to the channels can be varied as a function of time so as to ensure that the classes of bits having the greatest error sensitivity continue to be transmitted over the channels which are least susceptible to interference as the interference characteristics vary. As another example, the bandwidth or other characteristic of a particular channel or channels may be made to vary as a function of time. These and numerous other alternative embodiments and implementations within the scope of the following claims will be apparent to those skilled in the art.

What is claimed is:

1. A method of processing information bits for transmission in a communication system, the method comprising the steps of:

separating the information bits into n classes of bits based on error sensitivity, where n is greater than or equal to two; and assigning the classes of bits to n channels, each having an interference characteristic associated therewith, such that the class of bits having the greatest error sensitivity is transmitted over the channel which is the least susceptible to interference;

wherein the separating and assigning steps are implemented such that an amount of channel resources used for a particular class of information bits varies as a function of time.

2. The method of claim 1 further including the step of determining the interference characteristics associated with the n channels to be used in transmitting the information bits.

3. The method of claim 2 wherein the determining step includes the step of measuring interference levels for at least a subset of the channels.

4. The method of claim 2 wherein the determining step includes the step of obtaining information regarding known interference levels for at least a subset of the channels.

5. The method of claim 1 wherein each of the channels corresponds to one of a different frequency band, a different time slot, and a different code division slot.

6. The method of claim 1 further including the step of using the same convolutional code to encode two or more of the classes of information bits.

7. The method of claim 1 further including the step of using complementary punctured pair convolutional (CPPC) codes to encode at least one the classes of information bits.

8. The method of claim 1 wherein the assigning step includes providing a fixed assignment of the classes of bits to the channels.

9. The method of claim 1 wherein the assigning step includes providing a dynamic time-varying assignment of the classes of bits to the channels.

10. The method of claim 1 wherein the interference characteristics associated with at least a subset of the channels vary as a function of time, and further including the step of varying the assignment of the classes of bits to the channels so as to ensure that the classes of bits having the greatest error sensitivity continue to be transmitted over the channels which are least susceptible to interference as the interference characteristics vary.

11. The method of claim 1 wherein the interference characteristics associated with at least a subset of the channels vary as a function of position within a coverage area, and further including the step of varying the assignment of the classes of bits to the channels so as to ensure that the classes of bits having the greatest error sensitivity continue to be transmitted over the channels which are least susceptible to interference as the interference characteristics vary.

12. The method of claim 1 wherein at least one of the channels has a substantially uniform interference level, and further including the step of providing unequal error protection for the class of information bits within the at least one channel.

13. An apparatus for use in processing information bits for transmission in a communication system, the apparatus comprising:

a transmitter operative to separate the information bits into n classes of bits based on error sensitivity, where n is greater than or equal to two, and to assign the classes of bits to n channels having corresponding interference characteristics, such that the class of bits having the greatest error sensitivity is transmitted over the channel which is the least susceptible to interference;

wherein an amount of channel resources used for a particular class of information bits varies as a function of time.

14. The apparatus of claim 13 wherein the interference characteristics are determined by measuring interference levels for at least a subset of the channels.

15. The apparatus of claim 13 wherein the interference characteristics are determined by obtaining information regarding known interference levels for at least a subset of the channels.

16. The apparatus of claim 13 wherein each of the channels corresponds to one of a different frequency band, a different time slot, and a different code division slot.

17. The apparatus of claim 13 wherein the same convolutional code is used to encode two or more of the classes of information bits.

18. The apparatus of claim 13 wherein complementary punctured pair convolutional (CPPC) codes are used to encode one or more of the classes of information bits.

19. The apparatus of claim 13 wherein a fixed assignment of the classes of bits to the channels is used.

20. The apparatus of claim 13 wherein a dynamic time-varying assignment of the classes of bits to the channels is used.

21. The apparatus of claim 13 wherein the interference characteristics associated with at least a subset of the channels vary as a function of time, and the assignment of the classes of bits to the channels is varied so as to ensure that the classes of bits having the greatest error sensitivity continue to be transmitted over the channels which are least susceptible to interference as the interference characteristics vary.

22. The apparatus of claim 13 wherein the interference characteristics associated with at least a subset of the channels vary as a function of position within a coverage area, and wherein the assignment of the classes of bits to the channels is varied so as to ensure that the classes of bits having the greatest error sensitivity continue to be transmitted over the channels which are least susceptible to interference as the interference characteristics vary.

23. The apparatus of claim 13 wherein at least one of the channels has a substantially uniform interference level, and unequal error protection is provided for the class of information bits within the at least one channel.

24. A method of processing information bits for transmission in a communication system, the method comprising the steps of:

separating the information bits into n classes of bits based on error sensitivity, where n is greater than or equal to two; and selecting a given one of n channels for transmitting a corresponding one of the n classes of bits, based on relative interference characteristics of the n channels;

wherein an amount of channel resources used for a particular class of information bits varies as a function of time.

25. An apparatus for use in processing information bits for transmission in a communication system, the apparatus comprising:

a transmitter operative to separate the information bits into n classes of bits based on error sensitivity, where n is greater than or equal to two, and to select a given one of n channels for transmitting a corresponding one of the n classes of bits, based on relative interference characteristics of the n channels;

wherein an amount of channel resources used for a particular class of information bits varies as a function of time.

26. A method of processing information bits for transmission in a communication system, the method comprising the steps of:

separating the information bits into n classes of bits based on error sensitivity, where n is greater than or equal to two; and assigning the classes of bits to n channels, each having an interference characteristic associated therewith, such that the class of bits having the greatest error sensitivity is transmitted over the channel which is the least susceptible to interference;

wherein the interference characteristics associated with at least a subset of the channels vary as a function of time, and further including the step of varying the assignment of the classes of bits to the channels so as to ensure that the classes of bits having the greatest error sensitivity continue to be transmitted over the channels which are least susceptible to interference as the interference characteristics vary.

27. A method of processing information bits for transmission in a communication system, the method comprising the steps of:

separating the information bits into n classes of bits based on error sensitivity, where n is greater than or equal to two; and assigning the classes of bits to n channels, each having an interference characteristic associated therewith, such that the class of bits having the greatest error sensitivity is transmitted over the channel which is the least susceptible to interference;

wherein the interference characteristics associated with at least a subset of the channels vary as a function of position within a coverage area, and further including the step of varying the assignment of the classes of bits to the channels so as to ensure that the classes of bits having the greatest error sensitivity continue to be transmitted over the channels which are least susceptible to interference as the interference characteristics vary.

28. A method of processing information bits for transmission in a communication system, the method comprising the steps of:

separating the information bits into n classes of bits based on error sensitivity, where n is greater than or equal to two; and assigning the classes of bits to n channels, each having an interference characteristic associated therewith, such that the class of bits having the greatest error sensitivity is transmitted over the channel which is the least susceptible to interference;

wherein the assigning step includes providing a dynamic time-varying assignment of the classes of bits to the channels.

29. An apparatus for use in processing information bits for transmission in a communication system, the apparatus comprising:

a transmitter operative to separate the information bits into n classes of bits based on error sensitivity, where n is greater than or equal to two, and to assign the classes of bits to n channels having corresponding interference characteristics, such that the class of bits having the greatest error sensitivity is transmitted over the channel which is the least susceptible to interference wherein the interference characteristics associated with at least a subset of the channels vary as a function of time, and the assignment of the classes of bits to the channels is varied so as to ensure that the classes of bits having the greatest error sensitivity continue to be transmitted over the channels which are least susceptible to interference as the interference characteristics vary.

30. An apparatus for use in processing information bits for transmission in a communication system, the apparatus comprising:

a transmitter operative to separate the information bits into n classes of bits based on error sensitivity, where n is greater than or equal to two, and to assign the classes of bits to n channels having corresponding interference characteristics, such that the class of bits having the greatest error sensitivity is transmitted over the channel which is the least susceptible to interference;

wherein the interference characteristics associated with at least a subset of the channels vary as a function of position within a coverage area, and wherein the assignment of the classes of bits to the channels is varied so as to ensure that the classes of bits having the greatest error sensitivity continue to be transmitted over the channels which are least susceptible to interference as the interference characteristics vary.

31. An apparatus for use in processing information bits for transmission in a communication system, the apparatus comprising:

a transmitter operative to separate the information bits into n classes of bits based on error sensitivity, where n is greater than or equal to two, and to assign the classes of bits to n channels having corresponding interference characteristics, such that the class of bits having the greatest error sensitivity is transmitted over the channel which is the least susceptible to interference;

wherein a dynamic time-varying assignment of the classes of bits to the channels is used.

32. A method of processing information bits for transmission in a communication system, the method comprising the steps of:

separating the information bits into n classes of bits based on error sensitivity, where n is greater than or equal to two; and assigning the classes of bits to n channels, each having an interference characteristic associated therewith, such that the class of bits having the greatest error sensitivity is transmitted over the channel which is the least susceptible to interference;

wherein a first assignment of the classes of bits to the channels is used in a particular coverage area, and another assignment different than the first is used in at least one of: (i) a different portion of the coverage area, and (ii) another coverage area.

* * * * *